(12) United States Patent
Ochi

(10) Patent No.: US 6,305,808 B1
(45) Date of Patent: Oct. 23, 2001

(54) KALEIDOSCOPE

(75) Inventor: Hirotomo Ochi, Shizuoka (JP)

(73) Assignee: Ochi International Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/446,433

(22) PCT Filed: Feb. 4, 1999

(86) PCT No.: PCT/JP99/00471
§ 371 Date: Apr. 7, 2000
§ 102(e) Date: Apr. 7, 2000

(87) PCT Pub. No.: WO99/54777
PCT Pub. Date: Oct. 28, 1999

(30) Foreign Application Priority Data

Apr. 22, 1998 (WO) .................................... PCT/JP98/01839

(51) Int. Cl.[7] .................................................. G02B 27/08
(52) U.S. Cl. .......................................... 359/616; 446/219
(58) Field of Search .................................. 359/616, 617; 446/219, 491; 63/DIG. 2; D28/5

(56) References Cited

U.S. PATENT DOCUMENTS

| | | | |
|---|---|---|---|
| 2,697,380 | * 12/1954 | Wyser | 359/616 |
| 2,763,078 | * 9/1956 | Graves | 359/616 |
| 2,776,179 | * 1/1957 | Kemp et al. | 359/616 |
| 4,494,820 | * 1/1985 | Klawitter | 359/617 |
| 4,776,653 | * 10/1988 | Kaplan | 359/616 |
| 5,229,884 | * 7/1993 | Kelderhouse et al. | 359/616 |
| 5,304,112 | * 4/1994 | Mrklas et al. | 600/27 |
| 5,577,947 | * 11/1996 | Malloy et al. | 446/491 |

\* cited by examiner

Primary Examiner—Christopher E. Mahoney
(74) Attorney, Agent, or Firm—Wenderoth, Lind & Ponack, L.L.P.

(57) ABSTRACT

A kaleidoscope can have a particular visual object represented on the outer wall of its casing. An inner triangle casing of the kaleidoscope forms a gap with the tubular casing. A fragrance substance can be filled in the gap having a fragrance associated with the particular visual object represented in the outer wall of the casing. The plurality of slits in a closure on one end of the casing allows the fragrance to escape from the casing. A covering removably mounted on the end of the casing covers the slits when the kaleidoscope is not is use to prevent the fragrance from escaping. A light transmission plate may be provided within the casing having one or more graphical objects associated with the particular visual object represented on the outside of the casing such that the graphical object can be viewed through the end of the tubular casing. The kaleidoscope may further have a device to produce a sound associated with a particular visual object.

12 Claims, 8 Drawing Sheets

KALEIDOSCOPE

TECHNICAL FIELD

The present invention relates generally to a kaleidoscope, and more particularly to a kaleidoscope on which users can view ever-changing patterns visually, while listening to some music and smelling something fragrant.

BACKGROUND ART

A conventional kaleidoscope comprises a polygonal tubular casing that has a mirror inside and a peephole at one end, through which the user can enjoy himself or herself by looking at ever-changing beautiful patterns that are formed by loose bits of colored glass, colored paper, or the like placed inside, as the tubular casing is rotated (as disclosed in Japanese Utility Model Patent No. 3027750). In this kaleidoscope, the tubular casing is placed in an outer housing, which is simply decorated beautifully. In general, what attracts the attention of users is only the beautifully decorated appearance of the outer housing, and nothing more that pleases users can be obtained from the kaleidoscope itself.

There is also a kaleidoscope that is designed to present variously changing colors, patterns and the like that can be viewed visually through the peephole. There is no kaleidoscope, however, that is designed to allow users to associate any particular information that may be perceived visually from the look of the kaleidoscope with the content or information that may be viewed visually through the peephole, and to give all users some consistent impression and pleasure as a whole.

Very often and over time, users will become tired of using the kaleidoscope because they find it unpleasant and monotonous.

DISCLOSURE OF THE INVENTION

The present invention provides a kaleidoscope that is designed to present a particular visual object on the outer wall of the tubular casing forming the kaleidoscope, and to produce a particular sound and/or fragrant smell associated with the visual object presented on the outer wall when the user is looking into the kaleidosope through the peephole. It allows users to see ever-changing beautiful patterns through the peephole at one end of the tubular casing, while listening to a particular music and/or smelling a particular fragrant smell associated with the visual object on the outer wall, all of which may be produced from the kaleidoscope. Thus, the kaleidoscope can give users double and/or triple pleasures.

In addition, the present invention provides a kaleidoscope that is designed to present a particular visual object on the outer wall of the tubular casing forming the kaleidoscope, and to allow users to see ever-changing patterns through the peephole at one end of the tubular casing and to visually view a graphical object associated with the visual object presented on the outer wall, while listening to a particular sound and/or smelling a particular fragrant smell associated with the visual object presented on the outer wall, all of which may be produced from the kaleidoscope. Thus, the kaleidoscope can give users double and/triple pleasures.

The present invention solves the problems associated with the conventional kaleidoscope by providing the kaleidoscope as embodied and described below.

In one specific form of the kaleidoscope proposed by the present invention, the kaleidoscope comprises a tubular casing that presents a particular visual object on the outer wall thereof, including means for generating a particular sound associated with the particular visual object presented and/or means for generating a particular fragrant smell associated with the particular object presented that are provided within the tubular casing.

In a second specific form of the kaleidoscope proposed by the present invention, the kaleidoscope comprises a tubular casing that presents a particular object on the outer wall thereof, including a light transmission plate that may be removably inserted into the tubular casing and on which a graphical object, such as a picture or image, associated with the particular visual object presented on the outer wall of the tubular casing is presented, whereby users can see the graphical object on the light transmission plate by looking into the tubular casing through a peephole at one end of the tubular casing.

In a third specific form of the kaleidoscope proposed by the present invention, the kaleidoscope is a variation of the second kaleidoscope, wherein means for generating a particular sound associated with the particular visual object presented on the outer wall of the tubular casing and/or means for generating a particular fragrant smell associated with the particular object presented on the outer wall of the tubular casing are provided within the tubular casing.

In a fourth specific form of the kaleidoscope proposed by the present invention, the kaleidoscope comprises a tubular casing that presents a particular visual object on the outer wall thereof, including a light transmission plate on which a number of graphical objects, such as pictures or images, associated with the particular visual object presented on the outer wall of the tubular casing are arranged concentrically at regular intervals for presentation, and which are mounted pivotally within the tubular casing. Users can see one of the graphical objects presented on the light transmission plate by looking into the tubular casing through a peephole at one end of the tubular casing.

In a fifth specific form of the kaleidoscope proposed by the present invention, the kaleidoscope is a variation of the fourth kaleidoscope, wherein means for generating a particular sound associated with the particular visual object presented on the outer wall of the tubular casing and/or means for generating a particular fragrant smell associated with the particular visual object presented on the outer wall of the tubular casing are provided within the tubular casing.

In all of the specific forms of the kaleidoscope, the visual object to be presented on the outer wall of the tubular casing may include one or more of animals, insects, plants, constellations, dolls, and characters that are usually represented by pictures. For example, animals may include birds and beasts, such as Japanese nightingales, skylarks, cats and the like, that are commonly known as singers of beautiful and charming sounds, insects may include crickets and other insects that are commonly known as singers of beautiful and charming sounds, and plants may include all plants, such as plum, rose and the like, that are commonly known as producers of fragrant smell, or flowers, stems and leaves of those plants. Other objects may include characters or dolls that are well known to kids or children, such as heroes or heroines that appear in particular comics or animations, or particular theme music in such comics or animations, or constellations, or pictures such as scenes that gives users comfort and easiness.

The particular visual objects, such as the animals, insects, plants, constellations, dolls, and characters mentioned above, may be presented in the form of respective pictures on the outer wall of the tubular casing forming the kaleidoscope, while the particular music and/or fragrant smell associated with those particular objects presented may be available from the kaleidoscope. More specifically, the sound associated with the particular object presented on the outer wall of the tubular casing, such as the sound of the particular crying animal or singing, insect, the music associated with the particular constellation, and the main theme music associated with the particular comic or animation where characters appear, may be available from the kaleidoscope. The kaleidoscope may also provide the fragrant smell associated with a particular visual object presented on the outer wall of the tubular casing, such as the fragrance produced from a particular plant, the fragrance that gives users mental comfort, and the fragrance that relieves users of mental or physical stress.

It should be noted that visual objects may be presented on the outer wall of the tubular casing in several ways. For example, a particular visual object may be drawn or printed on the outer wall, or a photographic picture or seal representing a particular visual object may be attached to the outer wall, or a particular object such as a dried flower may directly be attached to the outer wall.

The means for generating sounds may be implemented by a sound-reproducing unit that replays a particular sound stored in its memory, or an electronic music box. The sound-reproducing unit may employ any known sound-reproducing device of the prior art that includes a memory, such as read-only memory (ROM), that stores a particular sound to be replayed in digital forms or a magnetic card or magnetic tape storing a particular sound to be replayed, a sound reproducer circuit, a speaker, and a power supply (for example, small button battery), and that may respond to any external stimulus (signal), such as vibration, pressure or rotation, from a sensor, or may be actuated in response to a particular input (signal) through a switching device, for reproducing the particular sound. This known sound-reproducing device may be used to pre-store any particular sound to be replayed, such as the sound of a particular singing bird or crying animal, the music associated with a particular constellation or star sky and the main theme music for a particular comic or animation, on the memory, magnetic card, or magnetic tape.

The means for generating a particular fragrant smell may include fragrant elements containing aromatic substances in granular, powdery, paste or solid forms, or fragrant elements containing aromatic substances derived by absorption or adsorption from any substances that produce a fragrant smell. When the fragrant element in granular or powdery forms is used, it may be packed in an air-permeable bag, which may be placed inside a tubular casing forming the kaleidoscope. For the fragrant elements in solid forms, they may include fragrant elements containing perfumery or aromatics in solid forms. The fragrant elements that contain aromatic substances derived by absorption or adsorption from the substances that produce a fragrant smell may include a sponge that contains an aromatic substance absorbed or adsorbed from perfumery, essential oil or fragrant oil.

According to the specific forms of the kaleidoscope of the present invention as described herein, a particular visual object may be presented on the outer wall of the tubular casing forming the kaleidoscope, while a particular fragrant smell and/or a particular sound (for example, cry of an animal or song of a bird) associated with the particular object presented on the outer wall of the tubular casing may be generated, or a particular music associated with the visual object presented on the outer wall of the tubular casing may be replayed. In contrast to the conventional kaleidoscope that only presents the ever-changing beautiful patterns visually, the kaleidoscope according to the present invention allows user not only to view those visual presentations, but also to smell the fragrance associated with the particular visual object presented on the outer wall of the tubular casing, as well as to listen to the sound associated with the particular visual object (bird, animal, or insect) presented on the outer wall of the tubular casing, such as cry of the animal or song of the bird or insect.

Furthermore, the kaleidoscope according to the present invention allows users to see the graphical object associated with a particular visual object presented on the outer wall of the tubular casing, in addition to the variously changing patterns and colors through the peephole that are provided by the conventional kaleidoscope, and listen to any of the sounds listed above and/or smell the particular fragrance concurrently. Thus, the visual object presented on the outer wall of the tubular casing, the graphical object associated with that visual object and seen visually through the peephole, and the sound and fragrant smell then produced may have a certain relationship, from which a certain theme or image may be imagined by the user. For example, when a kaleidoscope whose main theme is a particular constellation is provided, the particular constellation may be presented on the outer wall of the tubular casing, and the viewer may be allowed to see how the constellation is changing from season to season, i.e., spring, summer, autumn and winter, through the year while looking at the constellation through the peephole, may be allowed to listen to a music associated with the constellation that gives the viewer comfort, and may be allowed to smell a fragrance that also gives the viewer comfort. Similarly, when a kaleidoscope having the main theme of a particular animal is provided, the particular animal may be presented on the outer wall of the tubular casing, and the viewer may be allowed to see how that animal is growing while looking at the animal through the peephole, may be allowed to listen to the cry of the animal at every stage of the growth, and may be allowed to smell the fragrance of a plant peculiar to the region where the animal lives. In addition, when a kaleidoscope having the main theme of a character in a particular comic or animation is provided, the character may be presented on the outer wall of the tubular casing, and the viewer may be allowed to see the sequence of motions of the character while looking at the character through the peephole, and may be allowed to listen to a theme music associated with the comic or animation.

It may be appreciated from the foregoing description that as opposed to the conventional kaleidoscope, the kaleidoscope of the present invention may give users more pleasures, may enhance the effect of relaxation, and may provide the effect of aromatherapy.

A visual object that is presented on the outer wall of the tubular casing may be given a name, which may appear there together with that object (FIGS. 1, 4 and 7). This allows the user to identify the object. This also allows the user to identify the sound (cry of an animal or song of a bird) or the fragrance from the name of the object. Thus, the kaleidoscope is more fascinating. As the kaleidoscope is decorated on the outer wall of the tubular casing, it may also serve as the decorated article.

BRIEF DESCRIPTION OF THE ACCOMPANYING DRAWINGS

FIG. 15(*b*) is a cross-sectional view taken along the line H—H in FIG. 10;

BEST MODE OF EMBODYING THE INVENTION

EXAMPLE 1

Figure 1:
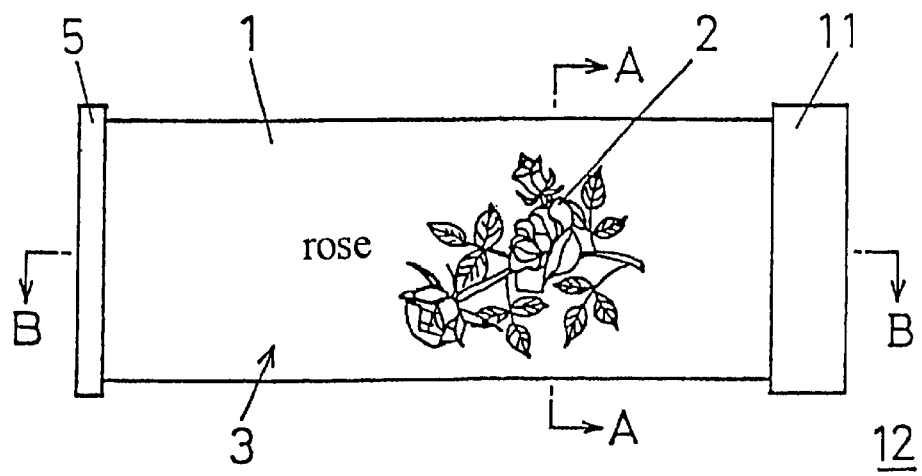
FIG. 1 is a front view illustrating a kaleidoscope according to a first preferred embodiment of the present invention.
Figure 2:
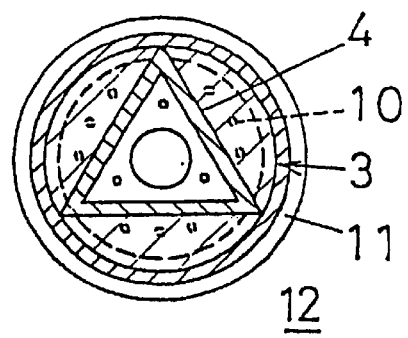
FIG. 2 is a cross-sectional view taken along the line A—A in FIG. 1.
Figure 3:
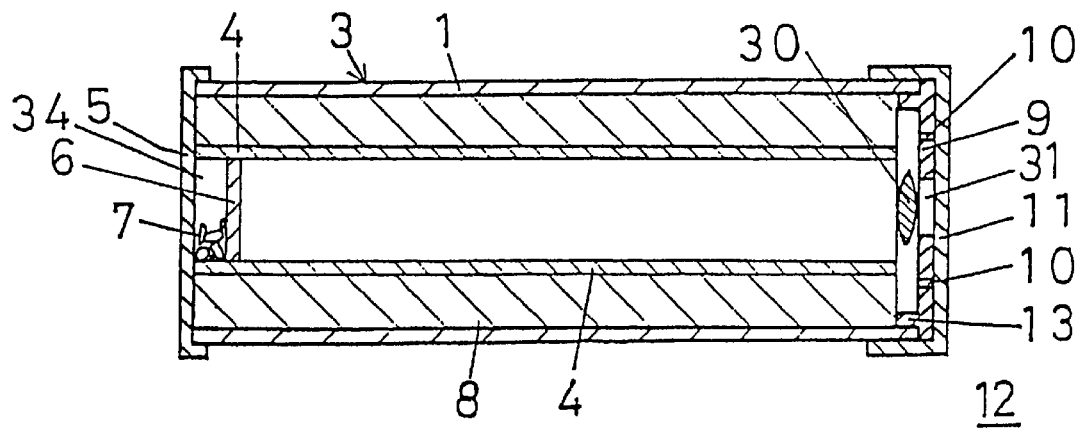
FIG. 3 is a cross-sectional view taken along the line B—B in FIG. 1.

Referring to FIGS. 1, 2 and 3, the first embodiment of the present invention is now described in detail. In the first embodiment shown, an outer tubular casing 3 made of paper has a picture representing a flower 2 printed on the outer wall 1 thereof, and includes a mirror inside. An inner triangle casing 4 having the cross section of a triangle is inserted into the outer tubular casing 3. The interior of the inner triangle casing 4 is separated by a transparent partition 6 at a predetermined point along the length of the inner triangle casing 4. The outer tubular casing 3 and the inner triangle casing 4 are covered by a semi-transparent plate 5 at one open end thereof (FIG. 3). A chamber or space 34 delimited by the transparent partition 6 in the inner triangle casing 4 and the semi-transparent plate 5 is filled with loose bits of colored glass, colored paper and the like 7.

The gap that is present between the outer tubular casing 3 and the inner triangle casing 4 is filled with a particular fragrant substance 8 in a paste form, which smells like a rose, for example (FIG. 3).

On the other open end of the outer casing 3 opposite the open end closed by the semi-transparent plate 5, there is a closure 9 that has a peephole 31 and an engaging projection 13 extending inwardly from the peripheral edge thereof The closure 9 may be removably mounted onto the outer casing 3 by the engaging projection 13.

A lens 30 is mounted between the peephole 31 and the open end of the inner triangle casing 4, as shown in FIG. 3. Instead of mounting the lens 30 as shown in FIG. 3, the lens 30 may be directly mounted on the corresponding open end of the outer tubular casing 3 or may be fitted into the peephole 31. The lens 30, which is shown as a convex lens in FIG. 3, may be replaced by a flat transparent plate or semi-transparent plate.

The closure 9 has a plurality of slits 10,10 through which a fragrance that smells like rose may be emitted from the fragrance element or source 8 inside the kaleidoscope generally shown by 12.

On the end of the outer tubular casing 4 where the closure 9 is detachably mounted, a covering 11 is removably mounted as shown in FIG. 3. When the kaleidoscope is not in use, the covering 11 may be mounted on that end in order to prevent the fragrance from the source 8 from leaking through the slits 10, 10.

On removing the covering 11 from the kaleidoscope 12 when it is used, the fragrance that smells like rose, which corresponds to the visual object as presented on the outer wall of the outer tubular casing 3 in this example, may be emitted through the slits 10, 10 on the closure 9. Then, by rotating the outer tubular casing 3, the loose bits of colored glass, colored paper and the like 7 within the space 34 delimited by the transparent partition 6 in the inner triangle casing 4 and the semi-transparent plate 5 may be moving around in different directions and may produce complicatedly changing geometrical patterns by reflecting in the mirror inside the inner triangle casing 4. While looking at those changing geometrical patterns through the peephole 31, the user can enjoy the fragrance that smells like rose as emitted from the kaleidoscope. As compared with the conventional kaleidoscope, therefore, the inventive kaleidoscope gives the user more pleasures, enhances the effect of relaxation, and provides the effect of aromatherapy.

In this example, the fragrant element or source 8 is provided in a paste form, and is filled in the gap between the outer tubular casing 3 and inner triangle casing 4. This fragrance source 8 may also be provided in a powdery or granular form, and may be packaged in an air-permeable bag, which may be attached behind the closure 9.

The fragrance source 8 may be provided in small bits of fragrant substance that are multicolored, and may replace the loose bits of colored glass, colored paper and the like 7. In this case, the partition 6 should be provided with slits.

In short, since the purpose is to emit the fragrance from the outer tubular casing 3, the fragrance source may be provided in any form, such as powdery, granular, paste or solid, and may be located anywhere within the outer tubular casing 3. It is noted, however, that the slits, through which the fragrance is emitted from the interior of the outer tubular casing 3 to the outside, should be located in such a position as to permit them to be closed by the covering 11, in order to avoid any leaks when the kaleidoscope 12 is not in use.

When the existing fragrance source becomes no longer effective, it may be refilled or may be replaced by a new fragrance source, by removing the closure 9.

In this example, a flower 2 that appears on the outer wall of the outer tubular casing 3 represents rose, but it may be replaced by other flowers or plants, such as lavender, cherry and the like, that produce respective fragrances, or stems or leaves thereof. Then, the fragrance source 8 that provides the fragrance of any of those flowers or plants may be placed inside the outer tubular

EXAMPLE 2

Figure 4:
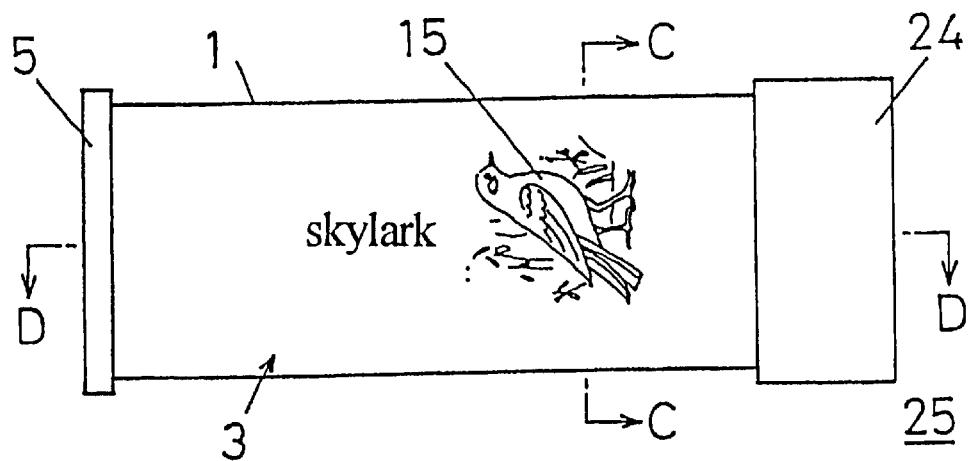
FIG. 4 is a front view illustrating a kaleidoscope according to a second preferred embodiment of the present invention.
Figure 5:
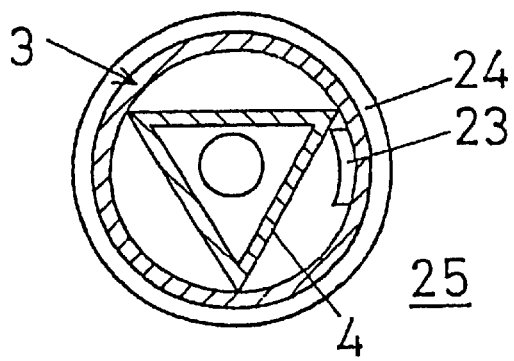
FIG. 5 is a cross-sectional view taken along the line C—C in FIG. 4.
Figure 6:
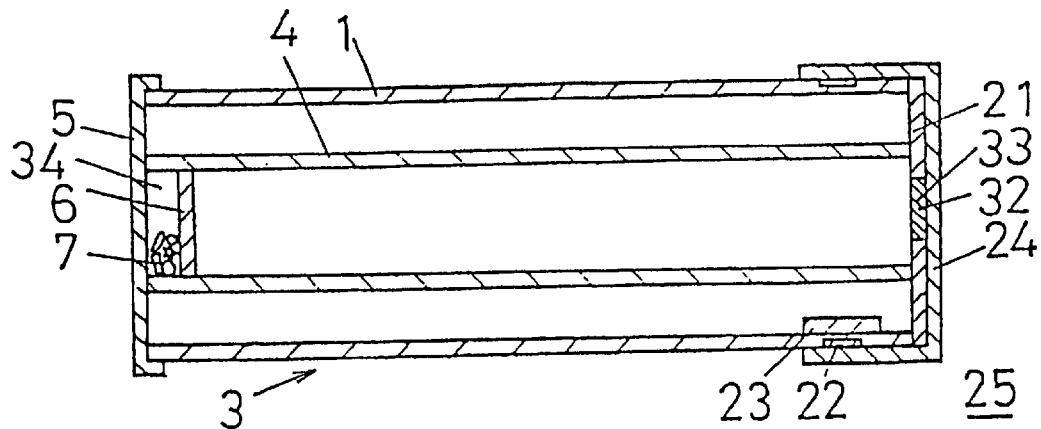
FIG. 6 is a cross-sectional view taken along the line D—D in FIG. 4.

The second embodiment of the present invention is now described by referring to FIGS. 4, 5 and 6.

In this embodiment, the kaleidoscope 25 differs from the kaleidoscope 12 in the preceding embodiment, in that a picture representing a skylark 15 is printed as a visual object on the outer wall 1 of the outer tubular casing 3, a closure 21 with a peephole 32 has no such slits as found on the closure in the preceding embodiment, the fragrant element or fragrance source 8 is replaced by a combination of a sound reproducing unit 23 and an optical sensor 22 coupled with the sound reproducing unit, and the covering 24, which selves to prevent leakage of the fragrance from the outer tubular casing 3 in the preceding example, is provided for shielding the optical sensor 22. Otherwise, the arrangement is essentially the same as that in the kaleidoscope 12, and those elements or parts that are functionally equivalent to those in the kaleidoscope 12 particularly shown in FIGS. 4 through 6 are given the same reference numerals.

In this example shown, the kaleidoscope 25 includes a flat transparent plate 33 that is fitted in the peephole 32, which may be replaced by the convex lens that may be disposed between the peephole 32 and the open end of the inner casing 4 just like the kaleidoscope 12 in the example 1. Alternatively, the flat transparent plate 33 may be replaced by a flat semi-transparent plate or a convex lens.

The sound reproducing unit 23 may employ any unit that is known to the prior art. The unit 23 employed in this example includes a memory in which the song of the skylark appearing on the outer wall of the casing 3 is pre-stored in digital form, a sound reproducer circuit, a speaker, and a small batter. The sound reproducing unit 23 is coupled with an optical sensor 22. The optical sensor 22 may be exposed to light when the covering 24 is removed, and may actuate the sound reproducing unit 23 to replay the sound of the skylark stored in the memory.

Then, by rotating the outer tubular casing 3, the loose bits of colored glass, colored paper and the like 7 within the chamber or space 34 delimited by the transparent partition 6 in the inner triangle casing 4 and the semi-transparent plate 5 may be moving around in different directions, and may produce complicatedly changing geometrical patterns by reflecting in the mirror inside the inner triangle casing 4. While looking at those changing geometrical patterns through the peephole 31, the user can enjoy listening to the sound of the skylark that can be heard from the inside of the outer tubular casing 3. This gives the user more pleasures, and may enhance the effect of relaxation.

In this example, the sound reproducing unit 23 may be actuated in response to signals from the optical sensor 22. The optical sensor may be replaced by other sensors, such as a pressure sensor, a vibration sensor and the like, or may be replace by an ON/OFF switch to the outer tubular casing 3 that may be operated to turn the sound reproducing unit 23 on and off.

The skylark that appears on the outer wall 1 of the outer tubular casing 3 in this example may be replaced by other birds such as a broad-billed roller, a canary and the like, or may be replaced by animals or insects. In those cases, the sounds the correspond to those birds, animals and insects may be pre-stored in the memory, and may be replayed by the sound reproducing unit 23 when the kaleidoscope 25 is used.

EXAMPLE 3

Figure 7:
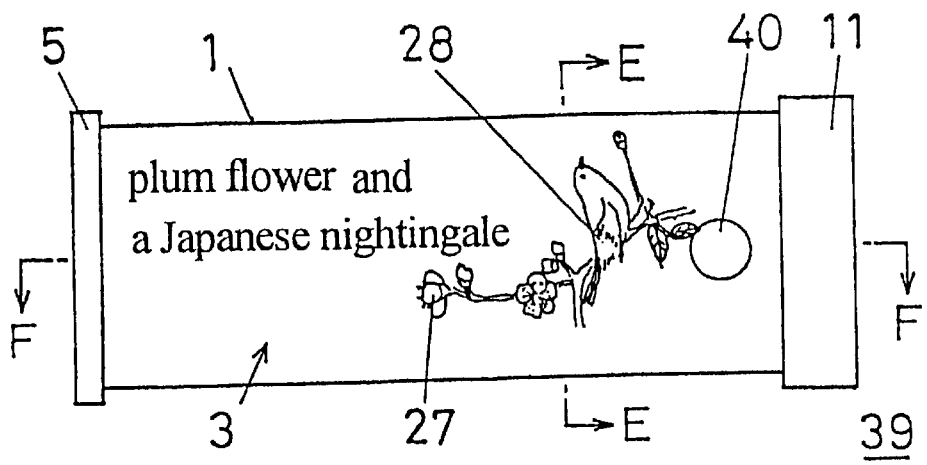
FIG. 7 is a front view illustrating a kaleidoscope according to a third preferred embodiment of the present invention.
Figure 8:
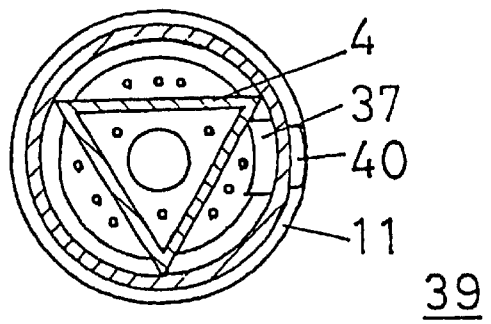
FIG. 8 is a cross-sectional view taken along the line E—E in FIG. 7.
Figure 9:
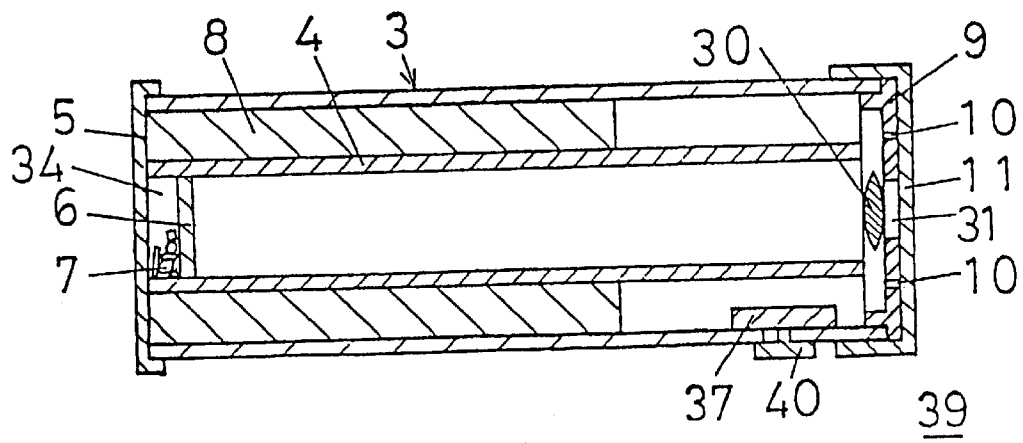
FIG. 9 is a cross-sectional view taken along the line F—F in FIG. 7.

Referring next to FIGS. 7, 8 and 9, the third embodiment is described.

The kaleidoscope 39 in this example includes an outer tubular casing 3 that is made of ceramic, and has a picture representing a plum flower 27 and a Japanese nightingale 28 printed on the outer wall 1 thereof.

It contains a fragrant element or fragrance source 8 in a paste form in the outer tubular casing 3, which emits a plum-like fragrance through slits 10, 10 on the closure 9, and an electronic music box 37 that may be turned on and off by a switch 40 for replaying the song of a Japanese nightingale pre-stored therein.

The electronic music box may employ any type of unit that is known to the prior art. The sound reproducing unit employed in the example 2 may be used. The basic arrangement, function and effect are the same as those in the examples 1 and 2, and those elements or parts in FIGS. 7 through 9 that correspond to those in the preceding examples are given the same reference numerals.

Upon removing the covering 11 from the kaleidoscope 39 when it is used, the plum-like fragrance for the plum flower 27 printed on the outer wall 1 may be emitted from the fragrance source 8 in the outer tubular casing 3 through the slits 10, 10 on the closure 9. Then, the electronic music box 37 may be operated by turning on the switch 40, which is external to the outer casing 3, and the song of the Japanese nightingale may then be heard. Then, by rotating the outer tubular casing 3, the loose bits of colored glass, colored paper and the like 7 within the space 34 delimited by the transparent partition 6 in the inner triangle casing 4 and the semi-transparent plate 5 may be moving around in different directions, and may produce complicatedly changing geometrical patterns by reflecting in the mirror inside the inner triangle casing 4. While looking at those changing geometrical patterns, the user can smell the plum-like fragrance for the plum flower 27 printed on the outer wall 1 of the outer tubular casing 3, and enjoy listening to the sound of the Japanese nightingale that can be heard from the inside of the outer tubular casing 3. This gives the user more pleasures, and may enhance the effect of relaxation.

The combination of the plum flower and Japanese nightingale that appears on the outer wall 1 of the outer tubular casing 3 may be replaced by other combinations, such as an animal and a plant, an insect and a plant, and the like.

EXAMPLE 4

Referring next to FIGS. 10 through 17, the fourth embodiment of the present invention is described.

The kaleidoscope in this example combines the concept of the kaleidoscope in the example 1 and the concept of the kaleidoscope in the example 2, and permits the user to see the graphical image or picture of the object associated with a particular visual object presented on the outer wall 1 of the outer tubular casing 3 when looking into the kaleidoscope through the peephole 31.

Figure 16:
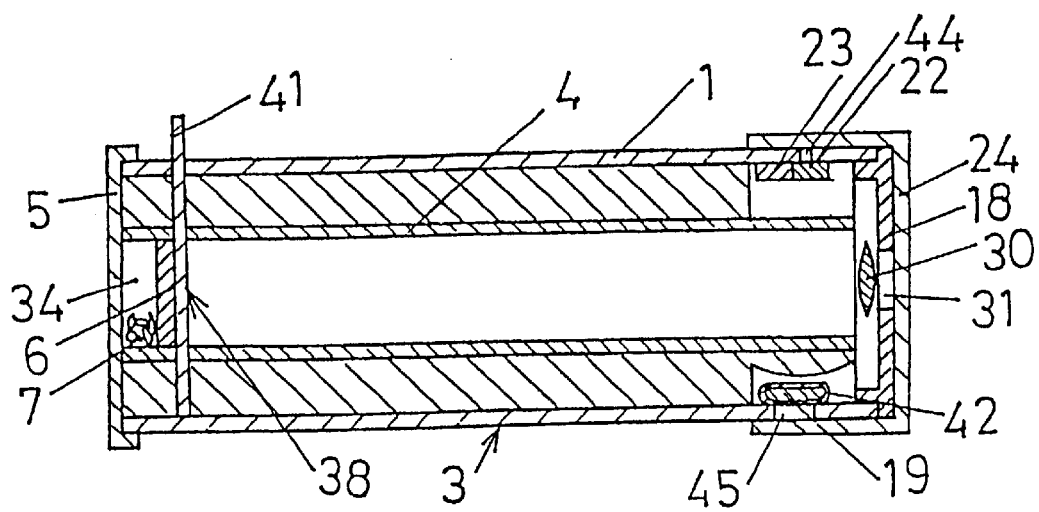
FIG. 16 is a cross-sectional view taken along the line I—I in FIG. 10.
Figure 17:
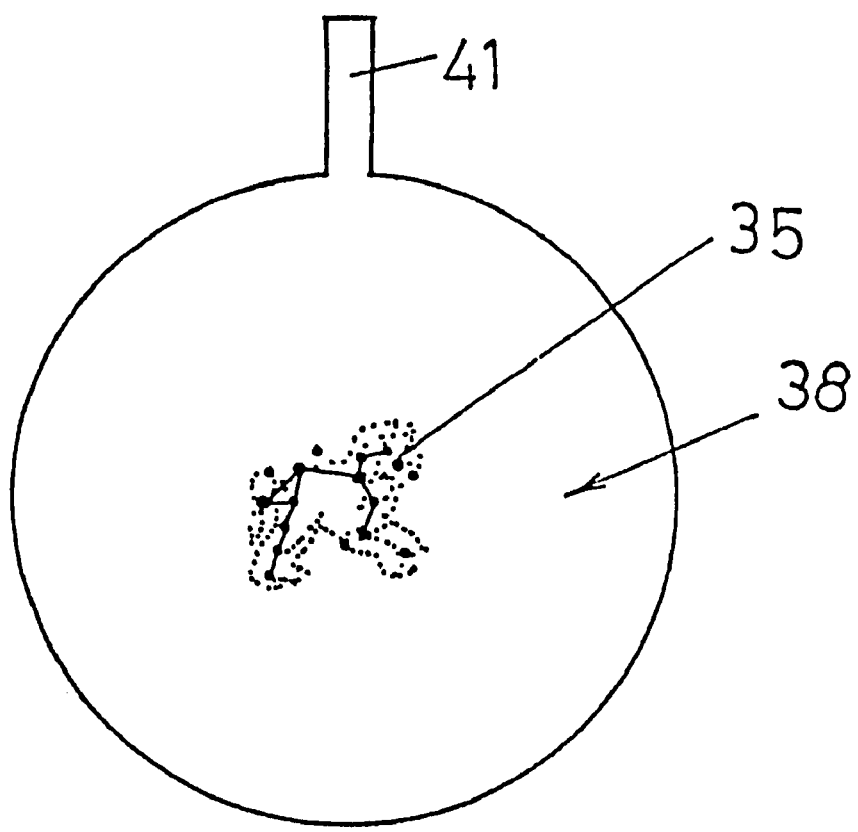
FIG. 17 is a side elevation illustrating a light transmission plate or sheet to be mounted in the kaleidoscope according to the embodiment of FIG. 10.

The kaleidoscope according to this embodiment differs form those in the examples 1 and 2 in that the light transmission plate 38 is not fixed, but may be detachably mounted to the combination of the outer tubular casing 3 and inner triangle casing 4. Specifically, the light transmission plate 38 is provided on the right side of the transparent partition 6 delimiting the inner triangle casing 4, so that it can be detachably mounted there (FIG. 16). The picture or graphical image of the object associated with the particular visual object on the outer wall 1 of the outer tubular casing 3 may appear on the central area of the light transmission plate 38, or on the area of the light transmission plate 38 that corresponds to the respective positions of the transparent partition 6 and convex lens 30 (FIG. 17). Then, by rotating the outer tubular casing 3, the loose bits of colored glass, colored paper and the like 7 within the space 34 delimited by the transparent partition 6 in the inner triangle casino 4 and the semi-transparent plate 5 may be moving around in the different directions, and may produce complicatedly changing geometrical patterns by reflecting in the mirror inside the inner triangle casing 4. When looking into the kaleidoscope through the peephole 31, those changing geometrical patterns can be seen. While looking at those changing geometrical patterns, the user can also see the picture or graphical image of the object appearing on the light transmission plate 38. Together with those visual presentations, the user can listen to the sound, and smell the fragrance, of the object associated with the visual presentations.

Figure 10:
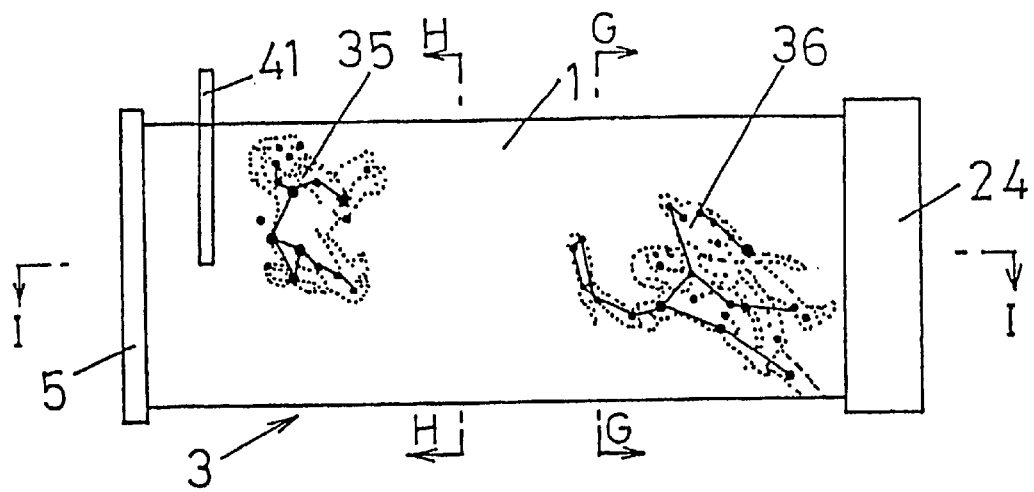
FIG. 10 is a front view illustrating a kaleidoscope according to a fourth preferred embodiment of the present invention, with a particular constellation presented on the outer wall of the tubular casing.
Figure 11:
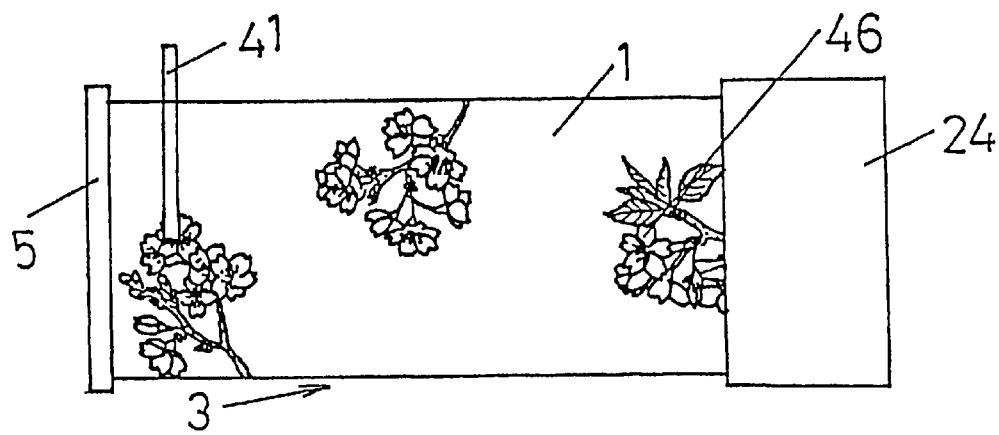
FIG. 11 is a front view illustrating the kaleidoscope according to the fourth preferred embodiment of the present invention, with a particular flower presented on the outer wall of the tubular casing.
Figure 12:
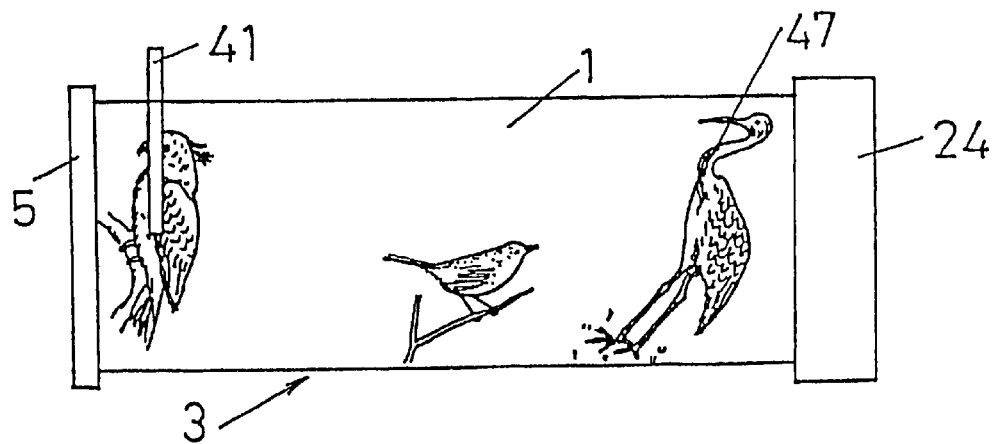
FIG. 12 is a front view illustrating the kaleidoscope according to the fourth preferred embodiment of the present invention, with a particular bird presented on the outer wall of the tubular casing.
Figure 13:
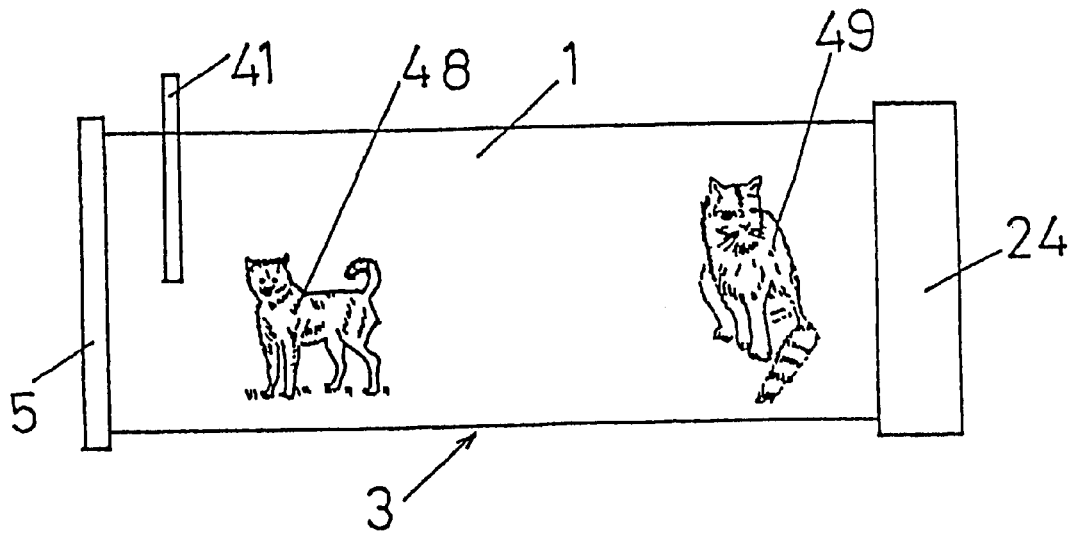
FIG. 13 is a front view illustrating the kaleidoscope according to the fourth preferred embodiment of the present invention, with a particular dog and a particular cat presented on the outer wall of the tubular casing.
Figure 14:
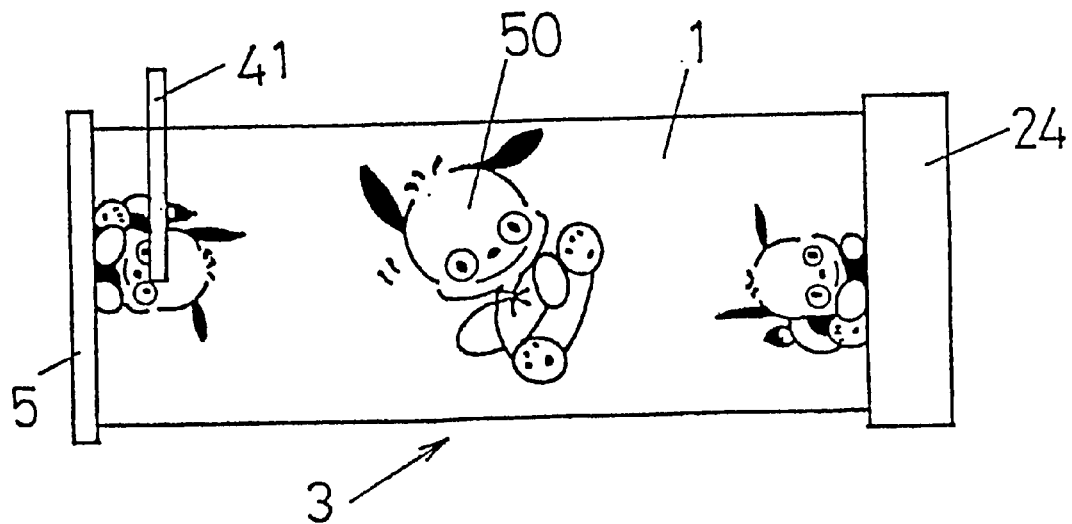
FIG. 14 is a front view illustrating the kaleidoscope according to the fourth preferred embodiment of the present invention, with a particular character presented on the outer wall of the tubular casing.
Figure 15A:
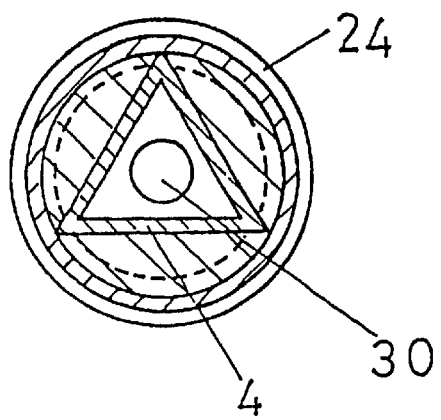
FIG. 15(*a*) is a cross-sectional view taken along the line G—G in FIG. 10.
Figure 15B:
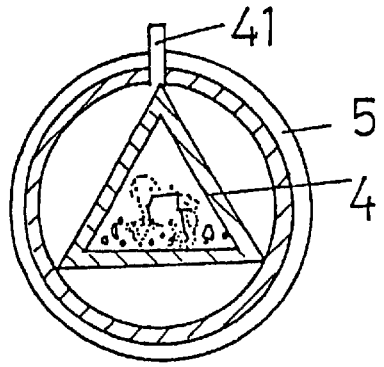

When constellations 35, 36 are presented on the outer wall 1 of the outer tubular casing 3 as shown in FIG. 10, the constellation 35, for example, may also be displayed on the central area of the light transmission plate 38 (FIG. 17). In this way, the user can look at the constellation 35 together with the complicatedly changing geometrical patterns produced by the loose bits of colored glass, colored paper and the like 7 moving around in different directions.

It is noticed from FIG. 16 that the kaleidoscope in this example is different from those in the examples 1 and 2 with regard to the manner of producing the sound and fragrance, as described below.

With regard to the audio sound reproduction, the difference from the example 2 is that a through hole 44 is provided on the outer wall 1 of the outer tubular casing 3, and the optical sensor 22 coupled with the sound reproducing unit 23 can be sensitive to the light passed through the through hole 44 from the outside.

With regard to the fragrance production, the difference from the example 1 is that an air-permeable fragrance box 42 containing a particular fragrant element or fragrance source 19 is located in the chamber or space delimited by the closure 18, and the closure 18 has no such slits as found on that in the example 1. Rather, the through hole 45 is provided on the outer wall 1 of the outer tubular casing 3 through which the particular fragrance may be emitted.

Different light transmission plates 38 may be provided to represent different graphical images or pictures of objects associated with the particular visual objects, respectively, which appear on the outer wall 1 of the outer tubular casing 3. Any appropriate one among those light transmission plates 38 may be selected, depending on the particular visual object of interest that appear there, and the particular graphical image or picture of the object (in this case, the constellation 35) on the selected light transmission plate may be seen together with the complicatedly changing geometrical patterns produced by the loose bits of colored glass, colored paper and the like 7 moving around. Similarly, different sound reproducing units 23 may be provided to replay different audio sounds associated with the visual objects that appear on the outer wall 1 of the outer tubular casing 3. An appropriate one among those sound reproducing units 23 may be selected, depending on the particular object of interest that appear there, and the particular audio sound may be heard. Also, different fragrant elements or fragrance sources 19 may be provided to produce different fragrances associated with the particular visual objects that appear on the outer wall 1 of the outer tubular casing 3. Similarly, any appropriate one among those fragrance sources 19 may be selected, depending on the particular visual object of interest that appears there, and the particular fragrance may be emitted.

The visual objects that may be presented on the outer wall 1 of the outer tubular casing 3 are, for example, the cherry flower 46 (FIG. 11), birds 47 (FIG. 12), dogs 48 or cats 49 (FIG. 13) and characters 50 (FIG. 14), in addition to the constellations 35, 36 in this example shown in FIG. 10.

For the graphical images or pictures associated with the visual objects presented on the outer wall 1 of the outer tubular casing 3 and that may also appear on the light transmission plates 38, the picture representing the same object as the visual object may be presented on the light transmission plate 38. In addition, other pictures may also be presented as follows.

For example, when a particular constellation is to be presented on the outer wall 1 of the outer tubular casing 3, several light transmission plates 38 may be provided to present the sequence of the particular constellation changing from season to season. When a particular plant, animal or insect is to be presented on the outer wall 1 of the outer tubular casing 3, several light transmission plates 38 may be provided to show every stage of its growth. When a particular character is to be presented on the outer wall 1 of the outer tubular casing 3, several light transmission plates 38 may be provided to represent the sequence of every motion of that character, or to represent the story behind the character.

The light transmission plate 38 may employ a transparent or semi-transparent synthetic resin plate. The picture may be directly printed or drawn graphically onto the light transmission plate 38, or a label or seal carrying such picture may be attached to the light transmission plate 38.

When the kaleidoscope described above is used, an appropriate one of the light transmission plates 38 that carries the picture associated with the particular visual object presented on the outer wall 1 of the outer tubular casing 3 may be selected, and may be inserted into the outer tubular casing 3 and inner triangle casings 4 by using a finger catch 41 (FIG. 16). Then, the covering 24 is removed, and by rotating the outer tubular casing 3, the picture of the appropriate constellation, i.e., Leo or the Lion 35 in this case, on the light transmission plate 38 may be viewed through the peephole 38, behind which the complicatedly changing geometrical patterns produced by the loose bits of colored glass, colored paper and the like 7 moving around may also be seen. When a particular bird 47 is presented on the outer wall 1 of the outer tubular casing 3, an appropriate one of the light transmission plates 38 that carries the picture of that bird associated with the particular visual object on the outer wall 1 of the outer tubular casing 3 may be selected, and may be inserted into the outer tubular casing 3 and inner triangle casings 4, while the sound reproducing unit 23 may be operated by exposing the optical sensor 22 to the light through the slit 44. Then, the song of that bird may be heard. When a particular flower 46 is presented on the outer wall 1 of the outer tubular casing 3, an appropriate one of the light transmission plates 38 that represents that flower may be selected, and may be inserted into the outer casing 3 and inner triangle casings 4. Then, the fragrance of the flower 46 may be emitted from the fragrance source 19 through the through the through hole 45.

The kaleidoscope according to this embodiment includes the combination of the light transmission plate 38 that may be removably inserted into the outer tubular casing 3 and inner triangle casing 4, the sound reproducing unit, and the fragrance emitting unit. It is noted that this combination may include the light transmission plate 38 alone, or the light transmission plate 38 and the sound reproducing unit, or the light transmission plate 38 and the fragrance emitting unit.

In this example, the light transmission plate 38 is located on the right side of the transparent partition 6 dividing the inner triangle casing 4, where it may be removably inserted into the outer tubular casing 3 and inner triangle casing 4 (FIG. 1), but it is not important where the light transmission plate 38 should be located. As shown in FIG. 16, the light transmission plate 38 may be located on the left side of the transparent partition 6, or it may be located anywhere between the transparent partition 6 and the right open end of the inner triangle casing 4.

EXAMPLE 5

Figure 18:
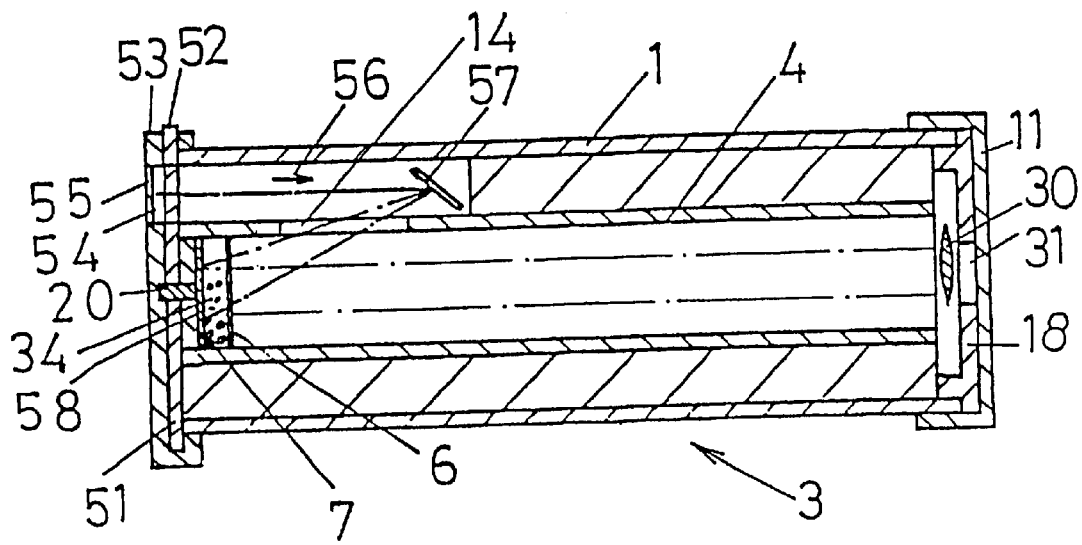
FIG. 18 is a cross-sectional view corresponding to the cross section of the embodiment in FIG. 16, illustrating a kaleidoscope according to a fifth preferred embodiment of the present invention.
Figure 19:
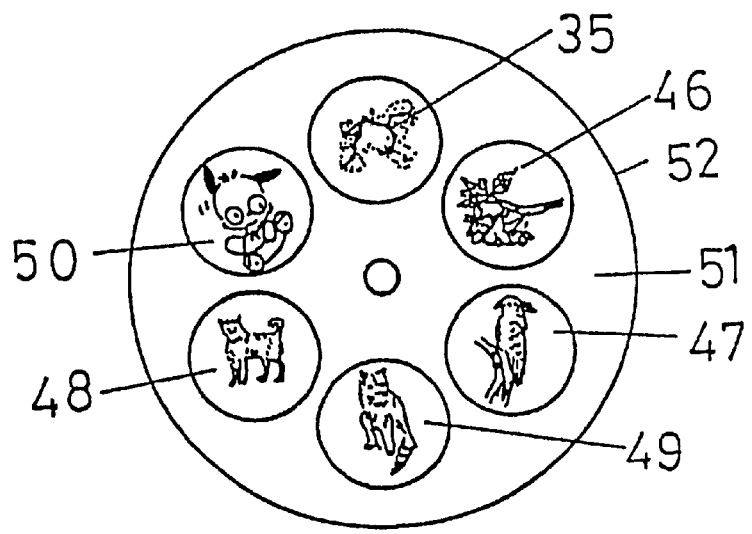
FIG. 19 is a side elevation illustrating a light transmission plate or sheet to be mounted in the kaleidoscope according to the fifth embodiment.

Referring next to FIGS. 18 and 19, the fifth embodiment of the present invention is described.

In the kaleidoscope according to the fourth embodiment just described above, when looking into the kaleidoscope through the peephole 31, the user can see the complicatedly changing geometrical patters produced by causing the loose bits of colored glass, colored paper or the like 7 to be moving around within the chamber or space 34 and reflected in the mirror inside the inner triangle casing 4, while looking at the picture of the object associated with the particular visual object presented on the outer wall 1 of the casing 3. Several light transmission plates 38 are provided to permit the user to select an appropriate one among those light transmission plates 38 that represents the picture of the object associated with the visual object on the outer wall 1 of the outer tubular casing 3, and to insert the selected light transmission plate into the outer tubular casing 3 and inner triangle casing 4.

The kaleidoscope according to the fifth embodiment includes a single light transmission plate 51 (FIG. 19) that represents a plurality of visual objects arranged concentrically at regular intervals. The light transmission plate 51 is mounted inside the outer tubular casing 3 and inner triangle casing 4, and is supported rotatably by the center shaft. When the user is looking into the kaleidoscope through the peephole 31, the user can see the complicatedly changing geometrical patters produced by causing the loose bits of colored glass, colored paper or the like 7 to be moving around within the chamber or space 34 and reflected in the mirror inside the inner triangle casing 4, and at the same time can selectively look at the appropriate picture of the object associated with the particular visual object presented on the outer wall 1 of the casing 3.

As shown in FIG. 18, a larger-diameter covering 53 is mounted around the left open end of the outer tubular casing 3. This covering 53 has a rotary shaft 20 at the center, to which the light transmission plate 51 is mounted. A reflector mirror 58 is fixed to the free end of the rotary shaft 20.

The covering 53 has a through hole 54, and a reflector mirror 57 is mounted inside the outer tubular casing 3 such that it may be aligned with the through hole 54 along the optical path between those two (FIG. 18). The light transmission plate 51 that carries several pictures 35, 46, 47, 48, 50 arranged concentrically at regular intervals is mounted such that it may be aligned with the through hole 54 on the covering 53 along the optical path between those two (FIG. 19).

A through hole 14 is provided on one side of the inner triangle casing 4, and the location and angle of the reflector mirror 57 as well as the location and size of the through hole 14 may be adjusted such that when looking into the kaleidoscope through the peephole 31 on the right side in FIG. 18, the light that enters through the transparent plate 55 fitted in the through hole 54 on the covering 53 can go from the left side as shown by arrow 56, passing through the reflector mirror 57, the through hole 14, the transparent partition 6, the reflector mirror 58, and the transparent partition 6, and finally going to the convex lens 30, and the picture 35 appearing on the light transmission plate 51 can be seen through the peephole 31 by the above incident light and the light reflected by the reflector mirrors 57 and 58. More specifically, the location and angle of the reflector mirror 57 as well as the location and size of the through hole 14 may be adjusted such that the picture 35 on the light transmission plate 51 may first be projected onto the reflector mirror 57, and the resulting image may be seen through the peephole 31 by reflection from the reflector mirror 58.

The peripheral edge 52 of the light transmission plate 51 is exposed to the outside on one side of the covering 53 as shown in FIG. 18. By rotating this exposed peripheral edge 52 in the circumferential direction to cause the light transmission plate 51 to rotate about the rotary shaft 20, the picture of interest may be selected from the pictures on the transmission plate 51 and seen through the peephole 31.

The chamber or space 34 delimited by the reflector mirror 58 and the transparent partition 6 may contain the loose bits of colored glass, colored paper and the like 7 that are similar to those in the preceding embodiments 1 through 4.

The kaleidoscope described in this example 5 may be used as follows. The covering 11 is first removed to allow the user to look into the kaleidoscope through the peephole 31. At this time, when a certain picture, i.e., the constellation 35 in this case, appearing on the light transmission plate 51 is aligned with the transparent sheet 55 fitted in the through hole 54 on the cover 53, this constellation can now be seen. If the picture of interest is a bird 4, for example, the exposed peripheral edge 52 of the light transmission plate 51 may be rotated in the circumferential direction until that picture can be seen through the peephole 31. Then, the outer tubular casing 3 may be rotated, causing the loose bits of colored glass, colored paper and the like 7 inside the chamber or space 34 to be moving around in different directions, thereby producing the complicatedly changing geometric patterns by reflecting in the mirror inside the inner triangle casing 4, which can be seen through the peephole 31.

The visual object that can be presented on the outer wall 1 of the outer tubular casing 3 may be provided by a detachable seal. Those detachable seals may represent different visual objects, and may be interchangeable. Then, a seal of interest may be selected and attached to the outer wall 1 of the outer tubular casing 3, and the picture of the object associated with the visual object on that seal may be selected by rotating the light transmission plate 51.

When a character in a particular comic or animation is to be presented on the outer wall 1 of the outer tubular casing 3, for example, the picture of the character may be represented by a sequence of motions on the light transmission plate 51, on which every picture corresponding to every motion may be arranged concentrically at regular intervals as shown in FIG. 19. Thus, every motion of the character may be seen as the sequence by rotating the light transmission plate 51 by every 60 degrees.

When a particular constellation is to be presented on the outer wall 1 of the outer tubular casing 3, for example, the picture of the constellation may be represented on the light transmission plate 51 such that it changes from season to season, such as spring, summer, autumn and winter through the year, and the picture of the constellation corresponding to every change may be arranged concentrically at regular intervals on the light transmission plate 51 as shown in FIG. 19. Thus, the change of the constellation from season to season may be viewed by rotating the light transmission plate 51.

The kaleidoscope being described in this example may include the fragrant element or fragrance source described in the first embodiment, the sound reproducing unit described in the second embodiment, or the combination of the fragrance source and sound reproducing unit described in the third embodiment. In either case, the kaleidoscope in this example may give users more pleasures.

According to all of the embodiments 1 through 5 described so far, the inner casing 4 is a triangle casing having the triangle cross section, and includes a total of three mirrors inside, each of which is mounted on each side of the triangle. This inner casing is mounted inside the outer tubular casing 3. Instead of the inner triangle casino an inner polygonal casing may be provided, inside which four or more mirrors may be mounted.

This polygonal casing may be mounted inside the outer tubular casing described in the examples 1 through 5, but may also be mounted inside an outer polygonal casing.

The kaleidoscope may comprise a single casing, i.e., a single polygonal casing having multi-mirrors mounted inside. In this case, one or more of the pictures representing an animal, insect, plant, constellation, doll and character may be presented on the outer wall of the polygonal casing. It is noted that the fragrant element or fragrance source, and the sound reproducing unit must be placed outside the polygonal casing.

In accordance with the present invention, the sound reproducing unit employs the conventional sound reproducing unit or electronic music box as described, but should not be limited to them. Any type of the conventional sound reproducing units that provide the cry of an animal, the song of a bird, or music associated with the visual object presented on the outer wall of the outer casing may be employed.

Although the present invention has been described with reference to the particular preferred embodiments thereof, it should be understood that various changes and modifications may be made without departing from the spirit and scope of the invention as defined in the appended claims.

What is claimed is:

1. A kaleidoscope comprising a tubular casing having an outer wall and an inner triangle casing inside said tubular casing such that a gap is formed between said outer tubular casing and said inner triangle casing, said kaleidoscope including.
   a particular visual object represented on said outer wall of said casing;
   a fragrant substance filled in said gap between said tubular casing and said inner triangle casing, said fragrant substance having a fragrance associated with said particular visual object;
   a closure mounted on said outer casing, said closure having a plurality of slits therein; and
   a covering removably mounted on an end of said outer casing, for covering said slits when mounted to prevent the fragrance from escaping and uncovering said slits in use to allow the fragrance to escape.

2. The kaleidoscope of claim 1, and further comprising a device to produce sound associated with said particular visual object, said device being disposed within said tubular casing.

3. The kaleidoscope of claim 2, wherein said device to produce sound is an audio replay unit having a memory in which a particular sound is pre-stored, or an electronic music box.

4. The kaleidoscope of claim 1, wherein said fragrant substance comprises a powder, granule, paste or solid, or a fragrant element obtained by absorbing or absorbing fragrance from a fragrant substance.

5. A kaleidoscope comprising a tubular casing having, an outer wall and an inner triangle casing inside said tubular casing such that a gap is formed between said outer tubular casing and said inner triangle casing, said kaleidoscope including:
   a particular visual object represented on said outer wall of said casing;
   a light transmission plate capable of being removably inserted into said tubular casing, and on which a graphical object associated with said particular visual object is presented, such that said graphical object can be viewed through one end of said tubular casing;
   a fragrant substance filled in said gap between said tubular casing and said inner triangle casing, said fragrant substance having a fragrance associated with said particular visual object;
   a closure mounted on said outer casing, said closure having a plurality of slits therein; and
   a covering removably mounted on an end of said outer casing for covering said slits when mounted to prevent the fragrance from escaping and uncovering said slits in use to allow the fragrance to escape.

6. The kaleidoscope of claim 5, and further comprising a device to produce sound associated with said particular visual object, said device being disposed within said tubular casing.

7. The kaleidoscope of claim 6, wherein said device to produce sound is an audio replay unit having a memory in which a particular sound is pre-stored, or an electronic music box.

8. The kaleidoscope of claim 5, wherein said fragrant substance comprises a powder, granule, paste or solid, or a fragrant element obtained by absorbing or absorbing fragrance from a fragrant substance.

9. A kaleidoscope comprising a tubular casing having an outer wall and an inner triangle casing inside said tubular casing such that a gap is formed between said outer tubular casing and said inner triangle casing, said kaleidoscope including:

a particular visual object represented on said outer wall of said casing;

a light transmission plate rotatably mounted within said tubular casing, and on which a plurality graphical objects associated with said particular visual object is presented and arranged concentrically at regular intervals, such that one of said graphical objects can be selectively viewed through one end of said tubular casing;

a fragrant substance filled in said gap between said tubular casing and said inner triangle casing, said fragrant substance having a fragrance associated with said particular visual object;

a closure mounted on said outer casing, said closure having a plurality of slits therein; and a covering removably mounted on an end of said outer casing for covering said slits when mounted to prevent the fragrance from escaping and uncovering said slits in use to allow the fragrance to escape.

10. The kaleidoscope of claim 9, and further comprising a device to produce sound associated with said particular visual object, said device being disposed within said tubular casing.

11. The kaleidoscope of claim 10, wherein said device to produce sound is an audio replay unit having a memory in which a particular sound is pre-stored, or an electronic music box.

12. The kaleidoscope of claim 9, wherein said device to produce sound is an audio replay unit having a memory in which a particular sound is pre-stored, or an electronic music box.

* * * * *